United States Patent
Kanedai et al.

(10) Patent No.: US 11,498,980 B2
(45) Date of Patent: Nov. 15, 2022

(54) METHOD FOR PRODUCING CELLULOSE NANOFIBER AND APPARATUS FOR PRODUCING CELLULOSE NANOFIBER

(71) Applicant: SAIDEN CHEMICAL INDUSTRY CO., LTD., Tokyo (JP)

(72) Inventors: Shuichi Kanedai, Saitama (JP); Yu Tokuda, Saitama (JP)

(73) Assignee: SAIDEN CHEMICAL INDUSTRY CO., LTD., Tokyo (JP)

( * ) Notice: Subject to any disclaimer, the term of this patent is extended or adjusted under 35 U.S.C. 154(b) by 561 days.

(21) Appl. No.: 16/567,794

(22) Filed: Sep. 11, 2019

(65) Prior Publication Data

US 2020/0109218 A1   Apr. 9, 2020

(30) Foreign Application Priority Data

Oct. 4, 2018   (JP) .............................. JP2018-188755

(51) Int. Cl.
  *D21B 1/34*   (2006.01)
  *C08B 15/08*   (2006.01)
  *B82Y 40/00*   (2011.01)

(52) U.S. Cl.
  CPC ................ *C08B 15/08* (2013.01); *D21B 1/34* (2013.01); *B82Y 40/00* (2013.01)

(58) Field of Classification Search
  CPC ...................................................... D21B 1/34
  USPC ........................................................ 162/63
  See application file for complete search history.

(56) References Cited

U.S. PATENT DOCUMENTS

2010/0069626 A1*   3/2010   Kilambi .................. C08H 8/00
                                                                  422/198

FOREIGN PATENT DOCUMENTS

| JP | 2010-235679 | 10/2010 |
| JP | 2014-177437 | 9/2014 |
| JP | 2018-095987 | 6/2018 |

* cited by examiner

*Primary Examiner* — Jacob T Minskey
(74) *Attorney, Agent, or Firm* — Hamre, Schumann, Mueller & Larson, P.C.

(57) ABSTRACT

Provided is a novel defibration method different from defibration by physical/mechanical pulverization and different from defibration by chemical modification. Provided is a defibration method and a production apparatus each capable of obtaining an intended, fine CNF without chemically modifying the CNF itself and by a treatment for a short time. A method for producing a cellulose nanofiber, the method being a method for continuously obtaining a cellulose nanofiber from raw material cellulose without performing chemical defibration and without performing physical/mechanical defibration in a post-treatment, and comprising mixing subcritical water in a high-temperature/high-pressure state, the subcritical water having a temperature of 180° C. or higher and lower than 370° C. and having a pressure of 5 MPa to 35 MPa, and the raw material cellulose, thereby defibrating the raw material cellulose to obtain a cellulose nanofiber dispersed in water, and a production apparatus for obtaining the cellulose nanofiber.

8 Claims, 4 Drawing Sheets

[Figure 1]
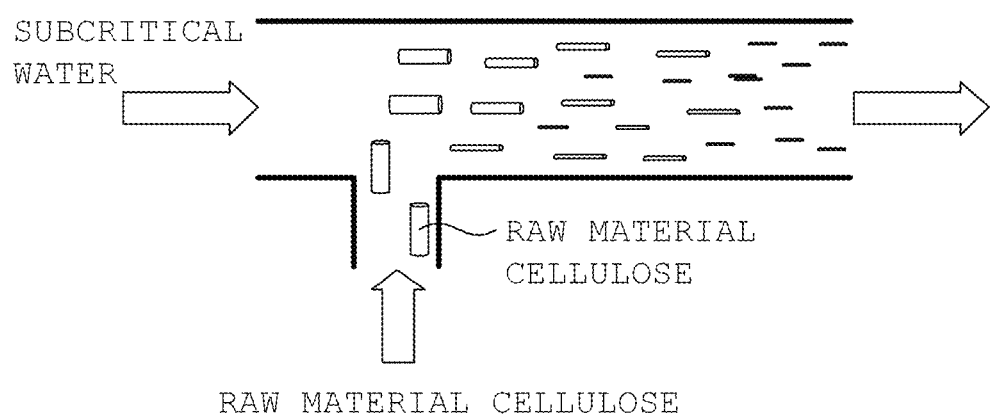
[Figure 2]
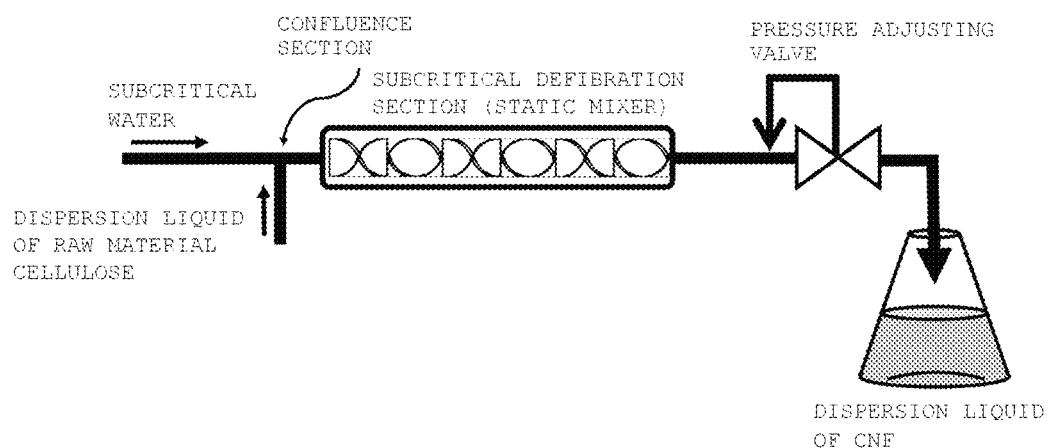

[Figure 3A]
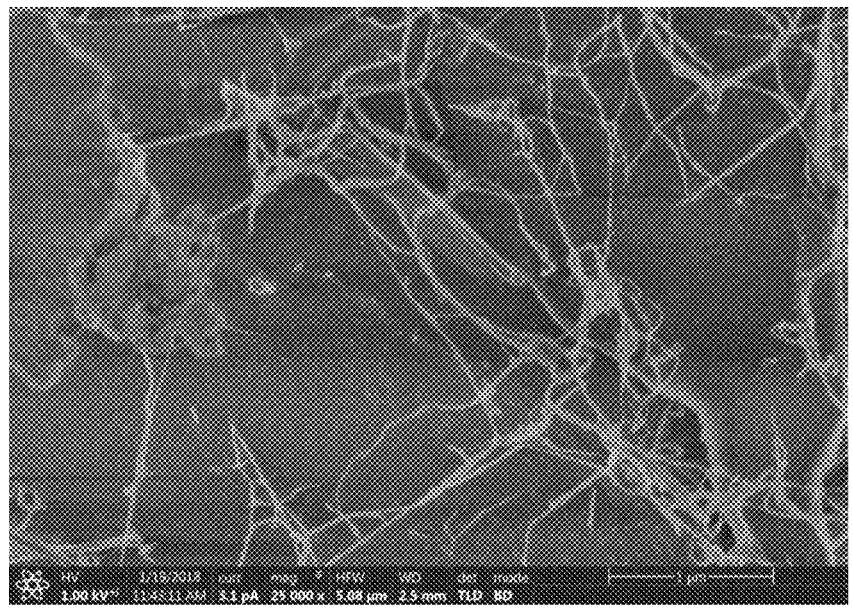
[Figure 3B]
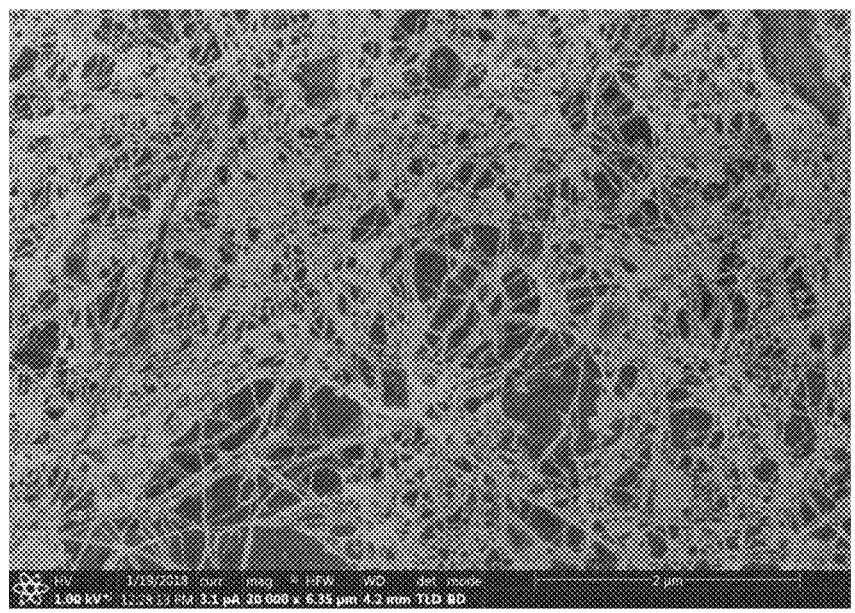

[Figure 4]
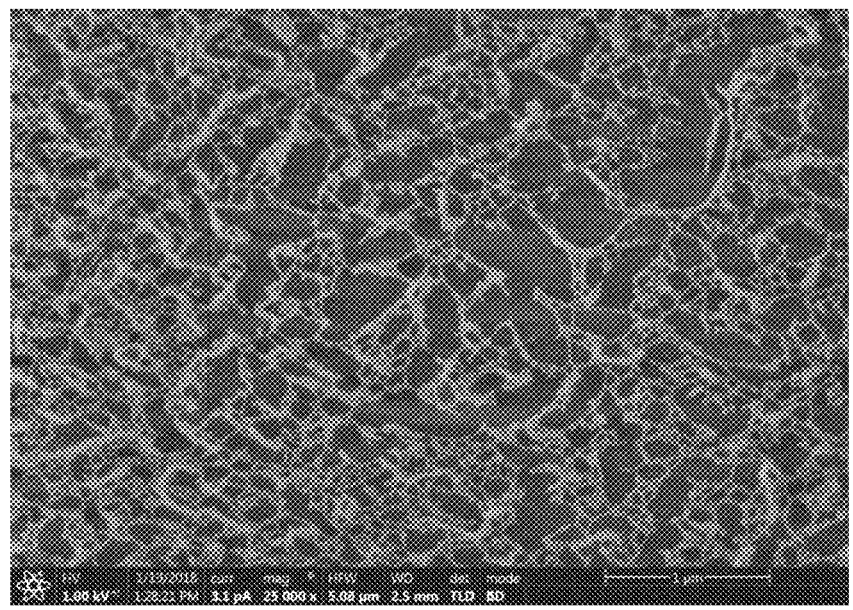

[Figure 5A]
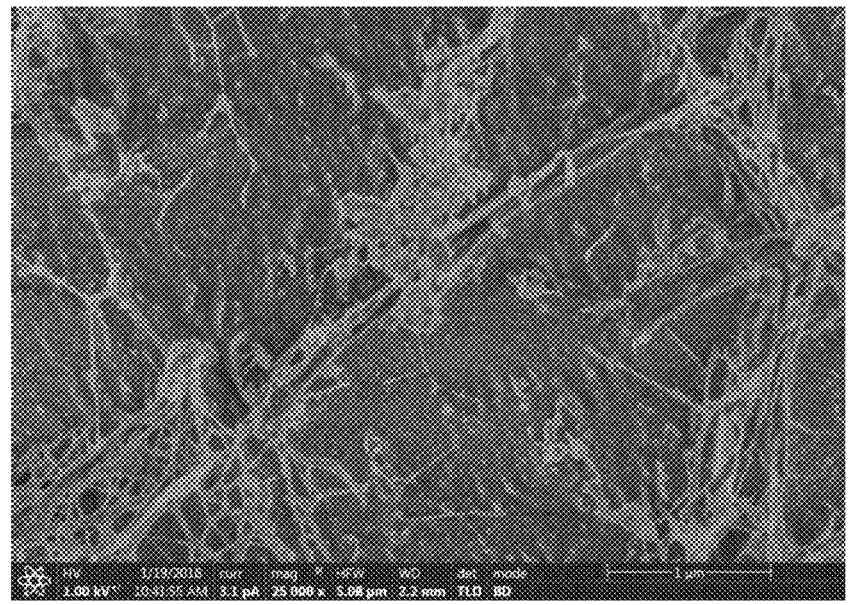
[Figure 5B]
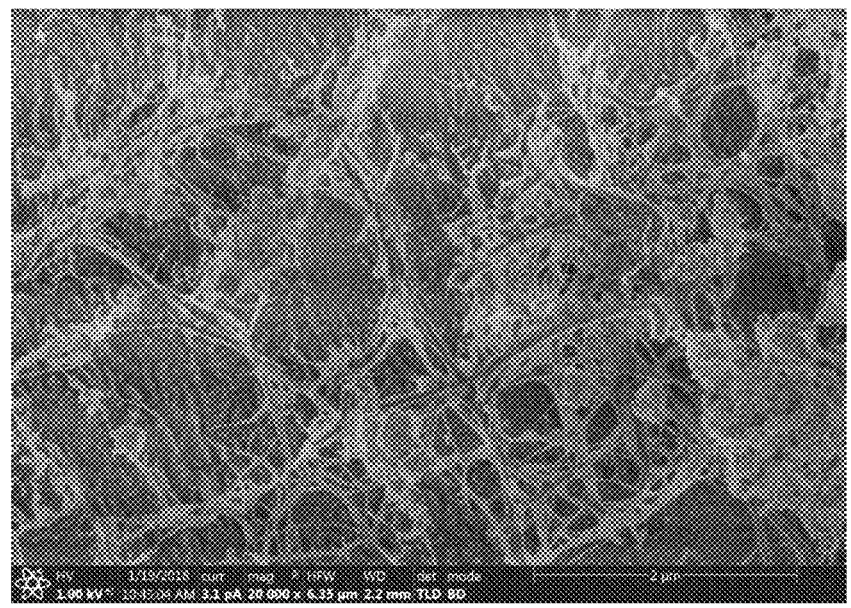

METHOD FOR PRODUCING CELLULOSE NANOFIBER AND APPARATUS FOR PRODUCING CELLULOSE NANOFIBER

BACKGROUND OF THE INVENTION

Field of the Invention

The present invention relates to a method for producing a cellulose nanofiber and an apparatus for producing a cellulose nanofiber, the apparatus for carrying out the method. In more detail, the present invention relates to a novel defibration technique for continuously obtaining a cellulose nanofiber having a thin fiber diameter by defibrating raw material cellulose without performing a chemical modification and without performing a physical/mechanical post-treatment by utilizing subcritical water in a high-temperature/high-pressure state of a temperature equal to or higher than the boiling point of water and lower than the critical point of water as specified in the present invention. The present invention relates to a technique capable of providing a production apparatus for carrying out the defibration technique and also capable of providing an excellent cellulose nanofiber that has a thin fiber diameter, that is in a state of cellulose of natural origin as it is, and that has never existed before. The "state of cellulose of natural origin as it is" as referred to in the present specification means a state in which a chemical modification is not performed on the cellulose nanofiber, so that the water resistance and oil resistance inherent in cellulose are not lost.

Description of the Related Art

Cellulose is a main element that constitutes woods, grass, flowers, and the like, and is a natural polymer which a plant has produced, and cellulose having a structure such that cellulose molecules have gathered fibrously is called a cellulose fiber. Among the cellulose fibers, cellulose having a fiber width of 100 nm or less and having an aspect ratio of 100 or more is generally called a cellulose nanofiber. Hereinafter, the cellulose nanofiber is sometimes abbreviated as "CNF". The CNF has excellent characteristics, such as a light weight, a high strength, and a low thermal expansion coefficient, and it is said that the CNF is one-fifth lighter and has a strength of five times or more than iron and steel although the raw material is a plant. Therefore, development to applications, such as building materials, home electric appliances, automobiles, and cosmetics, has been planned, and according to the forecast by Ministry of Economy, Trade, and Industry, the CNF is a material for which creation of the market of one trillion yen scale as CNF-related materials is expected in 2030. In recent years, high added values of the CNF have been recognized, and various methods for preparing a CNF efficiently have been studied.

It is known that in pulp, most of the CNFs exist in a state of having a fiber width of a micro size as a result of strong aggregation due to interaction represented by a hydrogen bond between CNFs, and such fibers having a fiber width of a micro size also exist as an aggregate of a higher order. Therefore, to obtain a CNF, there is a need to allow the defibration of an aggregate of single fibers, the aggregate having a fibrous form as a result of strong aggregation, to progress. The method for producing a CNF is largely classified into two types: a chemical method that includes an acid hydrolysis method and a 2,2,6,6-tetramethyl-1-piperidine-N-oxy radical (TEMPO) catalytic oxidation method; and a physical/mechanical method that includes a grinder method, a high-pressure homogenizer method, and an underwater opposite collision method. Moreover, various methods utilizing these methods have been proposed. When produced by a chemical method, a resultant CNF has a thinner fiber diameter than a CNF obtained by a physical/mechanical method, but has a problem that it is in a chemically modified state and it cannot be made into a CNF in a state of cellulose of natural origin, which a plant has produced, as it is.

In addition, in the production of a CNF, using a chemical method together with a mechanical method in such a way that after cellulose is defibrated by a chemical method, mechanical defibration is performed has been proposed. For example, there is a method for producing a CNF, wherein cellulose is defibrated by mechanically pulverizing a cellulose raw material obtained by oxidation using the previously described TEMPO or the like. In Japanese Patent Laid-Open No. 2010-235679, there has been proposed a method for obtaining a high-concentration CNF dispersion liquid that solves the problem of an increase in the viscosity of the cellulose raw material, the problem caused when the method is constituted as described above, and that is excellent in fluidity and transparency. In Japanese Patent Laid-Open No. 2018-95987, there has been proposed an apparatus for producing a CNF, the apparatus suppressing the problem of clogging and contamination of piping caused when the viscosity becomes higher every time the number of a mechanical treatment is increased in a case where raw material cellulose is treated mechanically, the case generally performed in the production of a CNF, thereby enabling production of the CNF efficiently.

In addition, it is described in Japanese Patent Laid-Open No. 2014-177437 that as a method for producing a CNF component of natural origin, the component used for a CNF-containing inflammatory bowel disease therapeutic agent, a cellulose-containing material is subjected to a hydrothermal treatment, thereby performing a defibration treatment. With respect to the hydrothermal treatment, it is described that a hydrothermal treatment of 120 to 180° C. for 30 to 120 minutes is generally performed. In Japanese Patent Laid-Open No. 2014-177437, cellulose is further defibrated by performing mechanical defibration using a wet type atomizer or a stone mill type grinder after the hydrothermal treatment, to obtain a CNF that can be made into a constituent for an inflammatory bowel disease therapeutic agent. That is, the method for producing a CNF, the method described in Japanese Patent Laid-Open No. 2014-177437, is a method in which the defibration of cellulose by the hydrothermal treatment and the mechanical defibration of cellulose are combined.

However, all the conventional methods for producing a CNF have a problem as described below. Firstly, the method for obtaining a CNF by defibrating cellulose by mechanical pulverization has an advantage of capable of obtaining a CNF in a state of cellulose of natural origin, which a plant has produced, as it is. However, in the method for defibrating cellulose by physical/mechanical pulverization, large shear force needs to be applied to cellulose, and therefore a pulverization device, such as a high-pressure homogenizer or a stone mill, is necessary, and particularly for the purpose of making a CNF into the one having a thinner fiber diameter, repeated pulverization treatments are necessary, so that there is a problem that large energy and longer treatment time are required. In addition, in this case, there is also a problem in production, which occurs to an apparatus, such as clogging and contamination of piping, as described in previously described Japanese Patent Laid-Open No. 2018-95987.

In addition, according to studies conducted by the present inventors, even if the number of mechanical treatments is increased, the defibration of cellulose is difficult by only physical/mechanical pulverization, and a CNF having a thin diameter, such as, for example, having a fiber diameter (fiber width) of less than 20 nm, cannot be obtained. In addition, a post-treatment for removing an accretion, such as lignin, which has adhered to a cellulose fiber may be needed depending on the application of the CNF, the cellulose raw material to be used, and the like. Further, it is conceivable that keeping the proportion of the accretion, such as lignin, which has adhered to a cellulose fiber in a desired range is required depending on the application of the CNF, and the like. In that case, a technique of capable of moderately and simply controlling the amount of the accretion, such as lignin, to a produced CNF is required. However, a technique of capable of favorably defibrating cellulose and capable of simply preparing a product in which the amount of the accretion, such as lignin, to a CNF is moderately controlled in a desired range has not been realized yet in the current techniques not limited to the techniques by physical/mechanical pulverization.

On the other hand, by the production method for obtaining a CNF by performing the defibration of cellulose by modification through chemical modification, cellulose can be defibrated without requiring large energy and time, which are required in the mechanical defibration treatment, and a CNF having a thin fiber diameter that cannot be achieved by mechanical defibration treatment can also be obtained. However, chemical defibration modifies cellulose, and hydrophilization, hydrophobization, or the like of cellulose is performed, and therefore a resultant CNF is not a CNF in the state of cellulose of natural origin, which a plant has produced, as it is. Therefore, there is a problem that a resultant CNF is a CNF in which water resistance or oil resistance, which are characteristics inherent in cellulose, are lost, or, depending on the application, there is a fundamental problem that a chemically modified CNF cannot be used.

The method for producing a CNF, wherein the chemical defibration of cellulose and the method for defibrating cellulose by mechanical pulverization are combined is effective, like the previously demonstrated technique described in Japanese Patent Laid-Open No. 2010-235679, but since the chemical defibration of cellulose is utilized therein, a resultant CNF is not in the state of cellulose of natural origin, which a plant has produced, as it is, and therefore there are problems which are similar to those problems described above.

In contrast, the method for producing a CNF, which is described in Japanese Patent Laid-Open No. 2014-177437, is for a chemical agent for medical use, and therefore the constitution is such that the hydrothermal treatment is utilized instead of utilizing the chemical defibration of cellulose, thereby obtaining the CNF in the state of cellulose of natural origin as it is. However, the hydrothermal treatment method is such that a batch treatment is performed with an autoclave apparatus or a high-pressure cooker setting a general treatment condition to 120 to 180° C. for 30 to 120 minutes. In the technique described in Japanese Patent Laid-Open No. 2014-177437, the material after the hydrothermal treatment which has been performed in the manner as described above is further subjected to a mechanical defibration treatment with a stone mill type grinder, a high-pressure homogenizer, or the like, and therefore there is a problem that the method is complicated, and it is difficult to obtain CNFs having the same characteristics stably. In addition, the technique described in Japanese Patent Laid-Open No. 2014-177437, which is similar to the previously described conventional methods, cannot continuously produce CNFs having the same quality and therefore has a problem as a method to be utilized industrially.

Accordingly, the main object of the present invention is to provide a novel defibration method that has enabled a continuous defibration treatment of a cellulose raw material in a short time, the defibration method different from the defibration by mechanical pulverization and different from the defibration by chemical modification. Another object of the present invention is to provide: a method for producing a CNF, the method capable of obtaining a CNF such that a resultant CNF is not chemically modified, is a CNF in a state of cellulose of natural origin, which a plant has produced, as it is, and is a CNF having an intended, desired, thin fiber diameter in a short time continuously; and an apparatus for producing a CNF, the apparatus capable of realizing this method. In addition, still another object of the present invention is to provide a method for producing a CNF, the method capable of performing the above-described favorable defibration of cellulose and also capable of moderately controlling the amount of an accretion, such as lignin, to the obtained CNF in a desired range. The final object of the present invention is to realize a technique capable of simply providing from raw material cellulose a CNF that has never been able to be obtained by a conventional technique, that is in a state of cellulose of natural origin, which a plant has produced, as it is, and that has a thin fiber diameter.

SUMMARY OF THE INVENTION

The above-described objects are achieved by the present invention described below. That is, the present invention provides a method for producing a CNF, the method described below.

[1] A method for producing a cellulose nanofiber, the method being a method for continuously obtaining a cellulose nanofiber from raw material cellulose without performing chemical defibration and without performing physical/mechanical defibration in a post-treatment, and comprising mixing subcritical water in a high-temperature/high-pressure state, the subcritical water having a temperature of 180° C. or higher and lower than 370° C. and having a pressure of 5 MPa to 35 MPa, and the raw material cellulose, thereby defibrating the raw material cellulose to obtain a cellulose nanofiber dispersed in water.

Preferred embodiments of the above-described [1] method for producing a CNF include those described below.

[2] The method for producing a CNF according to [1], wherein the raw material cellulose is continuously supplied in a flow of the subcritical water to allow the raw material cellulose to exist in the subcritical water for a short time of within 20 seconds, thereby performing the mixing to obtain the cellulose nanofiber continuously.

[3] The method for producing a cellulose nanofiber according to [1] or [2], wherein the method is for obtaining a cellulose nanofiber having an average fiber diameter of less than 20 nm.

[4] The method for producing a cellulose nanofiber according to any one of [1] or [3], wherein the high-temperature/high-pressure state has a temperature of 200° C. or higher and lower than 350° C. and has a pressure of 10 MPa to 35 MPa.

[5] The method for producing a cellulose nanofiber according to any one of [1] or [3], wherein the high-temperature/ high-pressure state has a temperature of 250° C. or higher and lower than 350° C. and has a pressure of 20 MPa to 35 MPa.

[6] The method for producing a cellulose nanofiber according to anyone of [1] or [5], further comprising a step of performing rapid cooling after the mixing.

In addition, the present invention provides CNFs described below as other embodiments.

[7] A cellulose nanofiber produced by the production method according to [1] to [6].

[8] A cellulose nanofiber not chemically modified and having an average fiber diameter of less than 20 nm.

[9] The cellulose nanofiber according to [8], wherein the average fiber diameter is 2 to 10 nm.

In addition, the present invention provides as still another embodiment [10] an apparatus for producing a cellulose nanofiber, the apparatus being a production apparatus for carrying out the method for producing a cellulose nanofiber according to anyone of [1] to [6], and comprising: a confluence section for making a flow of subcritical water in a high-temperature/high-pressure state, the subcritical water having a temperature of 180° C. or higher and lower than 370° C. and having a pressure of 5 MPa to 35 MPa, and a flow of a dispersion liquid of raw material cellulose confluent; and a subcritical defibration section arranged adjacent to the confluence section, the subcritical defibration section having a static mixer structure for sequentially stirring and mixing the subcritical water and the dispersion liquid being made confluent.

According to the present invention, provided are: a novel method for defibrating cellulose which is different from the defibration of cellulose by mechanical pulverization and is different from the defibration of cellulose by chemical modification, each having been performed in the conventional techniques; and a novel production apparatus capable of realizing the defibration method. A CNF obtained by the novel defibration technique according to the present invention is not a chemically modified CNF, is the one in a state of cellulose of natural origin, which a plant has produced, as it is, and can be made into a CNF having a thin fiber diameter that has not been able to be obtained by a conventional technique or a CNF having an appropriate fiber diameter that is desired depending on the application, and therefore utilization in a wide range can be expected. According to the present invention, provided are a method for producing a CNF and an apparatus for producing a CNF each capable of producing a CNF having the above-described excellent characteristics in a short time continuously. In addition, the CNF provided by the present invention is the one that is obtained in such a way that separation of a cellulose fiber constituting raw material cellulose from the other components has been performed favorably and that has a small amount of an accretion to the fiber surface. Further, according to the method for producing a CNF and the apparatus for producing a CNF each provided by the present invention, the amount of the accretion, such as lignin, to the resultant CNF can be controlled moderately and simply, and therefore a CNF having most suitable characteristics that correspond to the specific application or purpose can be provided.

BRIEF DESCRIPTION OF THE DRAWINGS

FIG. 1 is a schematic diagram for describing an outline of defibration of cellulose in the production method according to the present invention;

FIG. 2 is a schematic diagram illustrating one example of an apparatus for producing a CNF, the apparatus capable of carrying out defibration of cellulose in the production method according to the present invention;

FIG. 3A is a figure showing an SEM photograph of a CNF obtained in Example 1;

FIG. 3B is a figure showing an SEM photograph of the CNF obtained in Example 1 in a different magnification;

FIG. 4 is a figure showing an SEM photograph of a CNF obtained in Example 2;

FIG. 5A is a figure showing an SEM photograph of a CNF obtained in Comparative Example 1; and FIG. 5B is a figure showing an SEM photograph of the CNF obtained in Comparative Example 1 in a different magnification.

DETAILED DESCRIPTION OF THE PREFERRED EMBODIMENTS (Water in High-Temperature/High-Pressure State)

Hereinafter, the present invention will be described in more detail giving preferred embodiments for carrying out the invention. A method for producing a CNF according to the present invention is a method for continuously obtaining the CNF from raw material cellulose without performing chemical defibration and without performing mechanical defibration in a post-treatment. That is, the method for producing a CNF according to the present invention is characterized by mixing subcritical water in a high-temperature/high-pressure state, the subcritical water having a temperature of 180° C. or higher and lower than 370° C. and having a pressure of 5 MPa to 35 MPa, and the raw material cellulose, thereby defibrating the raw material cellulose to obtain a cellulose nanofiber dispersed in water continuously. More specifically, the present invention is a novel technique that can obtain a CNF having a desired fiber diameter continuously by constituting the mixing of subcritical water and the raw material cellulose such that the raw material cellulose is supplied in a flow of the subcritical water to allow the raw material cellulose to exist in subcritical water for a short time in units of several score seconds to several seconds, for example, for a short time of within 20 seconds.

The "subcritical water in a high-temperature/high-pressure state, the subcritical water having a temperature of 180° C. or higher and lower than 370° C. and having a pressure of 5 MPa to 35 MPa" (hereinafter, referred to as "subcritical water") that is utilized in the present invention will be described. The critical temperature of water is 374° C., and the critical pressure is 22.1 MPa. Supercritical water refers to a state of exceeding a boundary line between a high-temperature, high-pressure liquid having a temperature equal to or higher than the critical temperature of water and having a pressure equal to or higher than the critical pressure of water and a gas. Subcritical water that is utilized in the present invention is high-temperature, high-pressure liquid water having a temperature of lower than 370° C., which is equal to or lower than the critical temperature of water, and having a pressure of 5 MPa to 35 MPa. The difference between normal water and supercritical water and the difference between supercritical water and subcritical water are described as follows. Supercritical water has both of the characteristics of a liquid and of a gas, and, for example, has a density of about 0.03 to about 0.4 times the density of liquid water (1 g/cm$^3$) at room temperature, and the density is several score times to several hundred times larger than that of water vapor having a temperature of 100° C. and having a pressure of 0.1 MPa. On the other hand, the coefficient of viscosity of supercritical water is low, which is comparable to the coefficient of viscosity of a gas, and the self-diffusion coefficient of supercritical water is about an intermediate level between a liquid and a gas. That is, it can be said that supercritical water has large kinetic energy which is about the same as that of a gas molecule and has a density about $\frac{1}{10}$ times the density of a liquid, and is a very active fluid. On the other hand, subcritical water that is utilized in the present invention is not so active as compared to supercritical water, but is high-temperature, high-pressure liquid water having a strong hydrolyzing power. In addition, with respect to subcritical water and supercritical water, macro physical properties, such as density and solubility, to micro physical properties/structures, such as a solvation structure of a fluid molecule, can be controlled continuously and widely by controlling the temperature and the pressure.

Parameters, such as a dielectric constant and an ionic product, of subcritical water and of supercritical water can easily be controlled. The dielectric constant is a yardstick of polarity of a solvent, and a solvent dissolves well a substance having a dielectric constant value close to the dielectric constant of the solvent. For example, the dielectric constant of normal water at room temperature under atmospheric pressure is about 80, and a hydrocarbon having a low dielectric constant (for example, dielectric constant of benzene is 2.3) cannot be dissolved in water under this condition. However, the dielectric constant of supercritical water is about 1 to about 10, which is a value comparable to those of non-polar to weakly polar organic solvents, and therefore a large number of organic substances having a low dielectric constant can be dissolved. On the other hand, the dielectric constant of subcritical water is 15 to 45, which is comparable to those of weakly polar to intermediately polar solvents, and therefore a large number of organic substances can be dissolved. In addition, the ionic product of water is $10^{-14}$ mol$^2$/kg$^2$ at room temperature under atmospheric pressure, but the ionic product of supercritical water is lowered to about $10^{-15}$ to about $10^{-29}$ mol$^2$/kg$^2$. On the other hand, the ionic product of subcritical water is $10^{-12}$ to $10^{-11}$ mol$^2$/kg$^2$, which is 100 to 1000 times the ionic product at room temperature under atmospheric pressure. As described herein, it is known that subcritical water/supercritical water exhibit water-soluble to non-water-soluble properties in spite of each being a single solvent by changing the temperature and the pressure, and enable dissolving an organic substance having a low dielectric constant in the same manner.

However, supercritical water has a very strong decomposing power and therefore can decompose any organic substance completely in a short time, but on the other hand, utilization thereof has not progressed so much under present circumstances from the reasons that the treatment condition is severe, that a large amount of energy is consumed, that a heat-resistant/pressure-resistant reaction container is expensive, and the like. The present inventors have conducted studies on utilization of supercritical water for the defibration of the raw material cellulose in the process of studies on the method for producing a CNF. As a result, it has been found that the temperature of supercritical water is excessively high, causing a cellulose fiber to melt, so that a dispersion liquid of a CNF cannot be available, and therefore supercritical water is unsuitable and cannot be utilized for production of a CNF.

Thus, the present inventors have conducted diligent studies on utilization of hot water with which treatment conditions for the defibration of cellulose are not so severe as compared to the case where supercritical water is used and the temperature of which is in a relatively low region. As a result, the present inventors have found that by utilizing subcritical water specified in the present invention, a CNF that has not been able to be obtained by a conventional method, that is in a state of cellulose of natural origin, which a plant has produced, as it is, and that has a thin fiber diameter and a desired fiber diameter can simply be obtained from raw material cellulose, and have thereby reached the present invention. Subcritical water specified in the present invention has properties which normal water does not have, such as dissolving or hydrolyzing a non-polar organic compound, as well as supercritical water. In the present invention, by skillfully utilizing the properties of this subcritical water that is harmless and has a strong decomposing power, continuously obtaining an aqueous dispersion liquid of the above-described excellent CNF has been achieved.

In the process of conducting studies on using subcritical water for the defibration of raw material cellulose, the present inventors have found that when components containing the raw material cellulose are mixed using subcritical water by a batch system, the defibration of cellulose excessively progresses even in a short time and an aqueous dispersion of a CNF cannot be obtained, which is the same as in the case of supercritical water. In addition, in the process of the studies, it has been found that in the case of a cellulose raw material in which lignin and the like have adhered to a cellulose fiber, when the raw material cellulose is put into subcritical water, lignin and the like which have adhered to the fiber dissolve prior to the cellulose fiber and are separated, and when the liquid is cooled after that, the lignin for example is precipitated, but the precipitated lignin never adheres to the cellulose fiber again, and a CNF having a small amount of an accretion to the fiber surface is obtained. In contrast, when the raw material cellulose is defibrated mechanically, a CNF in the state of cellulose of natural origin as it is can be obtained, but the lignin and the like cannot be separated sufficiently, and therefore the CNF is the one in a state of having a large amount of the accretion to the fiber surface. Therefore, there has been a need for limiting the cellulose raw material to be used as a raw material, or there has been arisen a need for separating and removing the accretion, such as lignin and the like, separately after the defibration treatment of cellulose. Facing this point, the present inventors have conducted diligent studies on a method capable of defibrating the cellulose fiber in a state where most of the accretion is separated or in a state where the accretion is separated to a desired extent and stably obtaining a CNF in which cellulose is defibrated until a state of having a desired fiber diameter is achieved by skillfully utilizing the fact that the accretion, such as lignin and the like, dissolves prior to the cellulose fiber and is easily separated when raw material cellulose is mixed with subcritical water.

As a result, the present inventors have first found that using subcritical water being high-temperature, high-pressure hot water within the range specified in the present invention is effective. The treatment conditions with subcritical water specified in the present invention are not so severe as compared to those with supercritical water, adjusting conditions for achieving the above-described objects of the present invention is easy, the treatment time using subcritical water takes extremely short time, as short as in units of a second, and therefore the problem of consuming a large amount of energy can be reduced, so that the practicability is high.

Subcritical water that is utilized in the present invention is hot water having a temperature of 180° C. or higher and lower than 370° C. and having a pressure of 5 MPa to 35 MPa. Hot water more preferably having a temperature of 200° C. or higher and lower than 350° C. and having a pressure of 10 MPa to 35 MPa, or further, hot water having a temperature of 250° C. or higher and lower than 350° C. and having a pressure of 20 MPa to 35 MPa is preferably used. By utilizing subcritical water the temperature/the pressure of which are adjusted appropriately in the above-described ranges, the CNF intended by the present invention can be obtained in any case. According to studies conducted by the present inventors, raw material cellulose can be defibrated in a shorter time when higher-temperature/higher-pressure subcritical water is utilized. Accordingly, specific conditions of the temperature/the pressure of subcritical water that is utilized in the present invention may appropriately be determined in consideration of the balance with the desired fiber diameter of the CNF, the necessity for controlling the amount of the accretion to the CNF in the desired range, and the like.

The present inventors have conducted diligent studies on requirements by which the accretion such as lignin is separated from the cellulose fiber to remove the accretion almost completely and cellulose is defibrated into a desired CNF having an average fiber diameter of less than 20 nm by mixing the subcritical water specified in the present invention and raw material cellulose. As a result, it has been found that a dispersion liquid in which a CNF having characteristics desired in the present invention is dispersed in water can be obtained when the subcritical water and the raw material cellulose are mixed in an extremely short time, specifically, within several score seconds, for example, within 20 seconds, more specifically, in 1 to 5 seconds to reach a state where the subcritical water and the raw material cellulose are mixed.

In addition, as a result of further studies, it has been found that as a method of stably making the mixing state of subcritical water and raw material cellulose in an extremely short time as described above, supplying the raw material cellulose continuously in the flow of subcritical water to perform stirring and mixing is effective. Such constitution enables the raw material cellulose to exist in subcritical water stably in a short time of within several score seconds, more specifically within 20 seconds, and, can continuously produce, for example, an aqueous dispersion liquid of a CNF having a small amount of the accretion and having a desired average fiber diameter. On that occasion, by adjusting the temperature and the pressure of subcritical water within the high-temperature/high-pressure range specified in the present invention, or by appropriately adjusting the time for the raw material cellulose to be mixed with subcritical water specified in the present invention, an aqueous dispersion liquid of a CNF having a desired average fiber diameter can be obtained easily, stably, and continuously.

The CNF obtained in the manner as described above is not the one such that cellulose is chemically modified. Besides, there is an effect that a thin CNF having an average fiber diameter of, for example, less than 20 nm, which has never been able to be obtained when cellulose is defibrated by general physical/mechanical means as a method for obtaining a CNF in the state of cellulose of natural origin, which a plant has produced, as it is. In addition, according to the present invention, not only a CNF hardly having an accretion to the cellulose fiber surface can be used, but also a CNF in a state where an accretion has adhered in an appropriate range can be obtained. In addition, as described previously, according to the production method of the present invention, the average fiber diameter of a CNF can easily be made into a desired fiber diameter also by adjusting the time for allowing raw material cellulose to exist in subcritical water. For example, the above-described CNF having desired properties can also be obtained by a simple method of adjusting the flowing speed of subcritical water.

As described above, according to the production method of the present invention, cellulose can easily be defibrated in a short time with a simple apparatus, and continuously obtaining an aqueous dispersion liquid of a CNF having a desired average fiber diameter and being in a desired state can be realized. Besides, although a resultant CNF is not chemically modified and is in the state of cellulose of natural origin as it is, the CNF is, for example, is the one having an average fiber diameter of less than 20 nm and having a uniform fiber diameter. In addition, a CNF in which the amount of an accretion to the cellulose fiber surface is appropriately controlled can also be obtained. Therefore, by utilizing the CNF obtained by the production method according to the present invention, imparting a physical property, which has not been able to be imparted in a CNF obtained by a conventional production method, to various products can also be expected.

The production method according to the present invention enables defibrating cellulose into a desired CNF having a thin fiber diameter by a simple method such as adjusting the time during which raw material cellulose is supplied to and mixed with subcritical water while making the best use of the properties of subcritical water by using subcritical water having a temperature/a pressure adjusted appropriately within a particular range specified in the present invention. The production method according to the present invention is neither a production method in which cellulose is defibrated by chemically decomposing a cellulose raw material nor a production method in which cellulose is defibrated physically/mechanically and by which a CNF having a thin fiber diameter cannot be obtained. The production method according to the present invention is a technique for defibrating cellulose, wherein the properties of water, which exists widely on the earth, and which is inexpensive, harmless, and gives no load on the environment, are skillfully utilized, the technique having never existed before. Therefore, in the present invention, many treatment steps, treatment time, and the like necessary for conventional mechanical defibration, or a special chemical agent and the like necessary for defibration of cellulose by chemical modification are not used. In addition, a resultant CNF is a CNF in the form of not being subjected to chemical modification, having a small amount of an accretion, having a fiber diameter made into a desired thin state, and cellulose of natural origin as it is, the CNF not having been able to be realized by a conventional production method.

FIG. 1 is a schematic diagram for describing the outline of "defibration of cellulose by subcritical water" performed in the method for producing a CNF according to the present invention by which the defibration of cellulose can simply be performed by a novel method. The "defibration of cellulose by subcritical water" that is performed in the present invention can be realized by taking the constitution so that subcritical water and raw material cellulose can be mixed and the raw material cellulose can be allowed to exist in subcritical water in a short time. As shown in FIG. 1, by taking such constitution, in the raw material cellulose, the accretion and cellulose are dissolved sequentially by subcritical water while the raw material cellulose exists in subcritical water, so that the defibration of cellulose is performed.

FIG. 2 is a schematic outline diagram of one example of the apparatus for producing a CNF according to the present invention, the apparatus having a configuration by which the subcritical water defibration of cellulose, which characterizes the production method according to the present invention, can simply be carried out. As shown in FIG. 2, this apparatus is characterized by having a confluence section for making a flow of subcritical water and a flow of a dispersion liquid of the raw material cellulose confluent, and further, having a subcritical defibration section having a static mixer structure for sequentially stirring and mixing the subcritical water and the dispersion liquid which are made confluent by introducing a confluent liquid. In the apparatus shown in FIG. 2, the subcritical defibration section has a structure of a static mixer which is a static type mixing device not having a driving unit, and, as will be described later, subcritical water and the dispersion liquid of the raw material cellulose each constituting a fluid are sequentially stirred and mixed by a plurality of elements constituting the static mixer and having a peculiar shape. Therefore, by using the apparatus shown in FIG. 2, extremely simple operation of making the flow of subcritical water and the flow of the dispersion liquid of the raw material cellulose confluent, and only supplying these confluent fluids into the subcritical defibration section to allow the fluids to pass through the subcritical defibration section is carried out. As a result, subcritical water and the raw material cellulose are sequentially stirred and mixed, and cellulose is quickly defibrated during the stirring and mixing to be made into a dispersion liquid of a CNF sequentially, thereby enabling continuous production of the CNF having stable quality.

Hereinafter, the subcritical defibration section constituting the apparatus for producing a CNF according to the present invention and having a static mixer structure will be described in detail. A fluid composed of subcritical water and the dispersion liquid of raw material cellulose in a state of being made confluent is divided into two every time the fluid passes through this static mixer part constituting this subcritical defibration section. The fluids are rearranged and changed over along a twisted face in an element from the central part of a tube to the wall face and from the wall face of the tube to the central part. Further, a plurality of elements for applying the above-described action to a fluid are provided, and therefore the rotational direction is changed by every element, so that the fluid is subjected to abrupt turnover of force of inertia and stirred by a turbulent flow. As a result, the static mixer can sequentially mix and stir subcritical water and the raw material cellulose even though a driving unit does not exist.

The method for producing a CNF according to the present invention can be carried out by the above-described apparatus for producing a CNF according to the present invention which has an extremely simple configuration as shown in FIG. 2. The static mixer to be used in the subcritical defibration section of this apparatus is a static type mixing device not having a driving unit, and, as described previously, the division of the fluid, the rearrangement of the fluid, and the turn-over are sequentially performed, so that subcritical water and the raw material cellulose can sequentially be stirred and mixed. In addition, the static mixer is excellent in heat exchanging efficiency of a fluid and therefore can instantaneously make the temperatures of subcritical water and the raw material cellulose uniform. Thereby, the defibration of the raw material cellulose in a short time is enabled, so that the defibration can be allowed to progress further and a finer CNF can be produced. It is to be noted that a cooling unit (not shown in Figures) for cooling the liquid going out from the subcritical defibration section may be provided as necessary in the apparatus shown in FIG. 2. By using the apparatus as described above, the defibration of cellulose, which constitutes the production method according to the present invention, can be performed quickly, simply, and continuously, so that a CNF having a thin fiber diameter is obtained without further performing a post-treatment to perform physical/mechanical defibration as has been performed in a conventional technique.

By using the apparatus as exemplified above, subcritical water and the raw material cellulose can simply be made into a mixed state. As a result, cellulose in the raw material is quickly defibrated by subcritical water, so that a dispersion liquid containing a CNF having a thin average fiber diameter and being in the state of cellulose of natural origin as it is dispersed in water is formed in a short time efficiently. In addition, since the operation of defibrating cellulose is continuously performed as shown in the exemplified apparatus, the dispersion liquid in a state where the CNF in the intended form is dispersed in water can continuously be obtained according to the production method of the present invention. In the defibration of the raw material cellulose by subcritical water, which characterizes the present invention, the defibration is performed by skillfully utilizing the difference in the speed at which the accretion, such as lignin, and the cellulose fiber are dissolved by subcritical water, as described above. Therefore, a resultant CNF is the one in which the accretion is small in amount or the amount of the accretion is controlled according to the application although the CNF is the one in the state of cellulose of natural origin, which a plant has produced, as it is. It is to be noted that the accretion which is separated quickly from the cellulose surface by subcritical water may be precipitated by cooling, but never adheres to the surface of the obtained CNF again.

A subcritical water forming unit (not shown in Figures) which is to be used in the apparatus exemplified in FIG. 2 and which makes water into a state of subcritical water can also make water into a supercritical state that appears when water is placed in an ultimate environment of a high temperature/a high pressure. By adjusting the temperature and the pressure, subcritical water to be utilized in the present invention can easily be obtained. In the production method according to the present invention, by utilizing high-temperature/high-pressure subcritical water which is simply obtained by such an apparatus, which is milder than supercritical water, and which is specified in the present invention, the CNF which is intended in the present invention, which has a thin average fiber diameter, and which is in the state of cellulose of natural origin as it is can easily be obtained. In the present invention, various experiments have been conducted using a subcritical water to supercritical water treatment apparatus to reach the method for producing a CNF according to the present invention as a result of diligent studies. The details for this point will be described later.

Table 1 shows comparison of performance of CNFs obtained by mechanical defibration of cellulose, chemical modification defibration of cellulose, and the subcritical water defibration of cellulose according to the present invention which is performed by subcritical water.

TABLE 1

Comparison among characteristics of CNFs obtained by methods for defibrating cellulose

| Defibrating method (production) | | High aspect ratio | Transparency | Diameter distribution | Properties | Demerit |
|---|---|---|---|---|---|---|
| Mechanical (batch) | | Fair | Poor | Distribution is wide and broad | Properties inherent in CNF are retained | Time and cost are required for improving aspect ratio and transparency |
| Chemical modification (batch) | Hydrophilization | Good | Good | Relatively sharp | Hydrophilic | Inferior in water resistance |
| | Hydrophobization | Good | Good | | Lipophilic | Inferior in oil resistance |
| Subcritical water (continuous) | | Good | Good | Relatively sharp | Properties inherent in CNF are retained | — |

As shown in Table 1, in the subcritical water defibration of the raw material cellulose, which is performed in the present invention, by making the best use of the properties of subcritical water, and only adjusting the temperature/pressure conditions of subcritical water specified in the present invention or only appropriately adjusting the time during which the raw material cellulose is in a state of being mixed with subcritical water, a CNF which has a thin average fiber diameter, which is in the state of cellulose of natural origin as it is, and which is dispersed in water is easily obtained without utilizing chemical defibration.

The raw material cellulose to be used in the production method according to the present invention is not particularly limited, and cellulose as described below can be used. For example, various types of craft pulp derived from wood, sulfite pulp, powdered cellulose obtained by pulverizing the craft pulp or sulfite pulp with a high-pressure homogenizer, a mill, or the like, or a microcrystalline cellulose powder obtained by purifying the craft pulp or sulfite pulp by a chemical treatment such as acid hydrolysis, or the like can be used. In addition, a plant, such as kenaf, hemp, *Oryza sativa*, bagasse, or bamboo, can also be used. Among these, craft pulp, sulfite pulp, powdered cellulose, or a microcrystalline cellulose powder is preferably used from the viewpoint of mass production and costs. Particularly, when powdered cellulose and a microcrystalline cellulose powder are used, a CNF dispersion liquid having a lower viscosity in spite of high concentration can be produced. As the raw material cellulose to be used in the production method according to the present invention, raw material cellulose in which cellulose has an accretion, such as lignin, can also be used irrespective of the application and the purpose. Therefore, an advantage in production that a wide variety of cellulose can be used as a raw material can also be expected.

Next, the present invention will be described more specifically giving Examples and Comparative Example.
(Apparatus Used)

A treatment apparatus having the previously described configuration shown in FIG. 2, the apparatus having a subcritical water forming unit (not shown in Figures) capable of supplying subcritical water to supercritical water and capable of making water into high-temperature, high-pressure subcritical water specified in the present invention according to condition settings, was used for study tests. This apparatus includes: two inflow channels for allowing subcritical water and the dispersion liquid in which the cellulose raw material is dispersed with water to flow therein; a confluence section for making subcritical water and the dispersion liquid of the raw material cellulose, which have flowed in, confluent; and a subcritical defibration section having a static mixer structure, the section having a function by which the fluid after confluence is supplied, and subcritical water and the raw material cellulose each constituting the fluid are sequentially stirred and mixed. This apparatus is, as shown in FIG. 2, a continuous flow type apparatus with which an aqueous dispersion liquid of a CNF is obtained continuously by treating the raw material cellulose for a short time by subcritical water under predetermined conditions in the subcritical defibration section. In the study tests, various studies were conducted using the apparatus in FIG. 2 and using, as defibration conditions, high-temperature/high-pressure subcritical water to be hot water of 180° C. to 370° C., the temperature of which is lower than the critical temperature 374° C.

Specifically, the defibration conditions in the subcritical defibration section were set to the temperatures and pressure described below. That is, subcritical water having a temperature of 200° C. and subcritical water having a temperature of 230° C., each having a pressure of 25 MPa were used. For comparison, water having a temperature of 25° C. (normal temperature) and having a pressure of 0.1 MPa (normal pressure) was used. In addition, the concentration of cellulose in the dispersion liquid in which the raw material cellulose is dispersed in water was set to 0.6%. Craft pulp was used as the raw material cellulose used. Ion-exchanged water was used as water in all the tests. In the tests, subcritical water or water having normal temperature, and the dispersion liquid of the raw material cellulose were each allowed to flow at a rate of 5 mL/min, and were made confluent at the confluence section.

Example 1: Preparation of CNF

In the present Example, subcritical water having a pressure of 25 MPa and having a temperature of 200° C. and, as raw material cellulose, the above-described cellulose dispersion liquid having a concentration of 0.6% were used. The apparatus shown in FIG. 2 was used, subcritical water and the cellulose dispersion liquid were allowed to flow each at a rate of 5 mL/min to be made confluent in the confluence section, and a fluid composed of two confluent liquids of the cellulose dispersion liquid and subcritical water was supplied into the subcritical defibration section, thereby obtaining a CNF dispersion liquid having a concentration of 0.3%. The time during which the fluid flowed in the subcritical defibration section was 5 seconds.

FIG. 3A and FIG. 3B each show a figure of an SEM photograph of the CNF dispersion liquid having a concentration of 0.3%, obtained above. The magnification is different in FIG. 3A and FIG. 3B. As shown in these figures, an accretion to cellulose fibers was hardly recognized in the CNF obtained in the present Example. In addition, the average fiber diameter was about 15 nm, and therefore it was ascertained that the CNF is made so as to be in a state of having a thin fiber diameter and having a uniform diameter.

Example 2: Preparation of CNF

A CNF dispersion liquid having a concentration of 0.3% was obtained in the same manner as in Example 1 except that subcritical water having a pressure of 25 MPa and having a temperature of 230° C. was used. FIG. 4 shows a figure of an SEM photograph of the CNF dispersion liquid having a concentration of 0.3%, obtained in the present Example. As shown in FIG. 4, an accretion to cellulose fibers was hardly recognized in the obtained CNF. In addition, the average fiber diameter was about 10 nm, and therefore it was ascertained that the CNF is made so as to be in a state of having a thin, uniform fiber diameter. Further, from comparison between FIG. 3 and FIG. 4, it was ascertained that a CNF having a thinner fiber diameter is obtained by making the temperature higher.

Comparative Example

A CNF dispersion liquid having a concentration of 0.3% was obtained in the same manner as in Example 1 except that normal-temperature, normal-pressure water having a pressure of 0.1 MPa and having a temperature of 25° C. was used. FIG. 5A and FIG. 5B each show a figure of an SEM photograph of the CNF dispersion liquid having a concentration of 0.3%, obtained in the present Comparative Example. The magnification is different in FIG. 5A and FIG. 5B. As shown in these figures, it was ascertained that the obtained CNF is such that a large number of accretions has adhered to cellulose fibers, and CNFs having a fiber diameter of 100 nm or more were remarkable, which was different from Example 1 and Example 2, so that a CNF is not made so as to be in a state of having a thin, uniform fiber diameter.

What is claimed is:

1. A method for producing a cellulose nanofiber, comprising:

mixing a raw material cellulose dispersed in first water, with second water, the second water being subcritical water, so that the raw material cellulose defibrates in a dispersion liquid, and that the cellulose nanofiber dispersed in the dispersion liquid is produced, wherein the subcritical water has a temperature in a range of 180° C. or higher, but not reaching 370° C., and a pressure in a range from 5 MPa to 35 MPa, the dispersion liquid is a mixture consisting of the first water in which the raw material cellulose is dispersed, and the subcritical water, the method produces the cellulose nanofiber continuously from the raw material cellulose, and the method produces the cellulose nanofiber without performing in a post treatment, any defibration treatment selected from the group consisting of chemical defibration, physical defibration, and mechanical defibration.

2. The method for producing a cellulose nanofiber according to claim 1, wherein the method further comprising continuously supplying the raw material cellulose into a flow of the subcritical water so that the raw material cellulose contacts the subcritical water for 20 seconds or less, thereby the mixing being performed continuously.

3. The method for producing a cellulose nanofiber according to claim 1, wherein the resulting cellulose nanofiber has an average fiber diameter in a range of less than 20 nm.

4. The method for producing a cellulose nanofiber according to claim 1, wherein the subcritical water has the temperature in a range of 200° C. or higher, but not reaching 350° C., and the pressure in a range from 10 MPa to 35 MPa.

5. The method for producing a cellulose nanofiber according to claim 1, wherein the subcritical water has the temperature in a range of 250° C. or higher, but not reaching 350° C., and the pressure in a range from 20 MPa to 35 MPa.

6. The method for producing a cellulose nanofiber according to claim 1, further comprising cooling of the dispersion liquid in which the cellulose nanofiber is dispersed, after the mixing.

7. The method for producing a cellulose nanofiber according to claim 1, wherein the raw material cellulose contacts the subcritical water for a time in a range from one to twenty seconds.

8. The method for producing a cellulose nanofiber according to claim 1, wherein the raw material cellulose contacts the subcritical water for a time in a range from one to five seconds.

* * * * *